Feb. 13, 1945     F. C. WARREN     2,369,421
SELF-LUBRICATING BEARING AND BELLCRANK
Filed Dec. 30, 1942
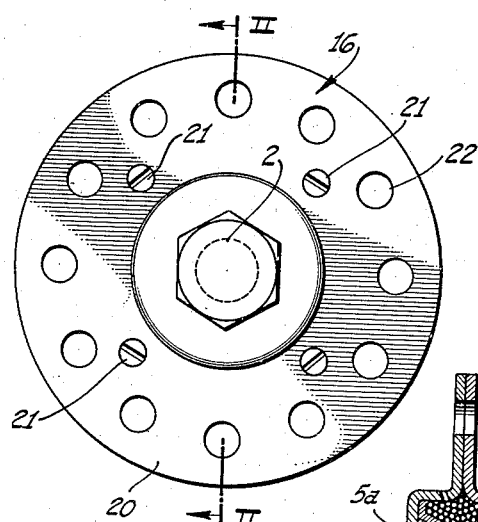
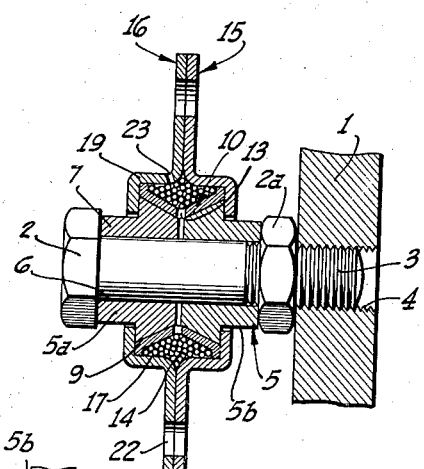
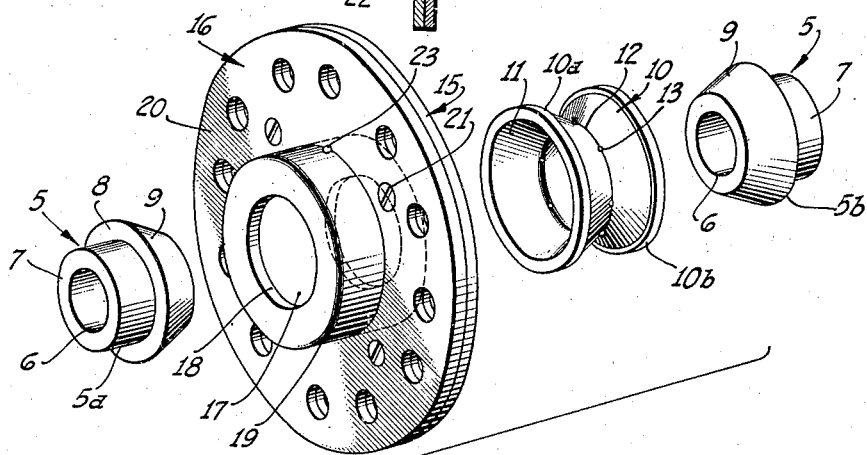
INVENTOR.
FREDERICK C. WARREN,
BY *Harold W. Mattingly*
ATTORNEY.

Patented Feb. 13, 1945

2,369,421

UNITED STATES PATENT OFFICE 2,369,421

SELF-LUBRICATING BEARING AND BELL CRANK

Frederick C. Warren, Los Angeles, Calif.

Application December 30, 1942, Serial No. 470,556

5 Claims. (Cl. 308—18)

My invention relates to self-lubricating bearings and has particular reference to bearings which may be employed for the transmission of control forces on aircraft controls.

In aircraft it is the common practice to employ control apparatus for controlling portions of the wing or tail surfaces and other devices on the aircraft by interconnecting such devices with control handles or levers in the cockpit by means of rods. Whenever these rods are required to transmit forces in other than in alignment with the longitudinal direction of the rod, it is common practice to interpose in the rod assemblies bellcranks interconnecting adjacent sections of the control rods by which the direction of the control forces is changed. Other control devices employed in aircraft include the use of cables which, when the direction of their movement changes, are trained over pulleys.

With either type of control it is essential that the bellcranks or the pulleys operate with the least possible resistance to movement and that the bellcranks or pulleys be adapted to resist side thrusts.

Heretofore it has been the practice to employ accurately ground roller or ball bearings for these devices but such roller or ball bearings are expensive and, because of the accuracy of machining which is required, are difficult to manufacture in the quantities required for the present emergency production program.

It is therefore an object of my invention to provide a bearing structure adaptable for use in aircraft control connections which may be readily and inexpensively manufactured with a minimum of accurate machining required.

Another object of my invention is to provide a bearing structure of the character set forth in the preceding paragraph, in which the bearing is adapted to not only transmit loads circumferentially of the bearing but also to resist sidewise thrusts in either lateral direction.

Another object of my invention is to provide a bearing structure of the type described, in which the bearing is substantially self-lubricating.

Another object of my invention is to provide a bearing of the charatcer described, in which the bearing is adjustable in service to take up for any wear which may occur.

Another object of my invention is to provide a bearing structure of the character described, in which many of the parts may be manufactured by a stamping process while the remainder of the parts may be manufactured readily upon automatic screw machines.

Another object of my invention is to provide a bearing structure of the character described and a bellcrank structure which may be assembled therewith and in which the bellcrank is readily formed from a pair of matching stampings to facilitate ready and simple production thereof.

Other objects and advantages of my invention will be apparent from a study of the following specifications, read in connection with the accompanying drawing, wherein Fig. 1 is an elevational view of a bellcrank and bearing constructed in accordance with my invention;

Fig. 2 is a detail vertical sectional view taken along line II—II of Fig. 1;

Fig. 3 is an exploded perspective view of the bellcrank and bearing assembly shown in Figs. 1 and 2; and Fig. 4 is a detail sectional view similar to Fig. 2, illustrating a modified form of my invention.

Referring to the drawing, I have illustrated my bearing assembly as associated with a bellcrank of the character hereinbefore described, in which the bearing is adapted for mounting upon any suitable stationary portion of a plane, a ship or other structure upon which control devices are to be mounted, the bearing structure being illustrated in Fig. 2 as being mounted upon a strut or other vertical portion 1 of the vehicle to which the bearing is to be attached as by means of a bolt or stud 2 threaded as indicated at 3 to enter and be secured to a threaded bore 4 on the supporting structure 1. The stationary bearing member is indicated at 5, which may be constructed as a double cone sleeve, or preferably, as is shown in Figs. 2 and 3, from two separate pieces 5a and 5b of material stock.

Each of the bearing pieces 5a and 5b is formed with an internal bore 6 adapted to fit with reasonable closeness upon the exterior surface of the bolt 2 while the exterior of the sleeve 5a is formed with a body portion of one diameter, as indicated at 7, and with an enlargement, as indicated at 8, the peripheral surface of the enlargement 8 being beveled to form a frusto-conical bearing surface indicated at 9.

The bearing sleeve 5b is constructed in the same manner so that these pieces may be readily turned out on automatic screw machines in mass production the sleeves 5a and 5b being duplicates of each other.

The engaging bearing surface is formed as a relatively thin metal sleeve 10, the shape of which is particularly illustrated in Fig. 3 as a pair of conical structures joined together at the apices of the cones to thus provide internal surfaces 11 matching the external surfaces 9 of the two bearing sleeve members 5a and 5b. As will be understood from an inspection of Fig. 3, the part 10 may be formed on screw machines or may be readily stamped out or rolled to the desired shape without requiring accurate machining and when assembled with the two bearing sleeve members 5a and 5b any minor inaccuracies of fit between the member 10 and the members 5a and 5b may be taken up by an adjustment of the members 5a and 5b toward each other.

As shown particularly in Fig. 2, the members 5a and 5b are slidable upon the bolt 2 so that by tightening or loosening the bolt relative to its supporting structural member 1, the two sleeves 5a and 5b may be drawn toward each other until the cone surfaces of the sleeves 5a and 5b and the member 10 will fit snugly upon each other.

In order to permit the rigid attachment of the bolt 2 to its supporting structure 1 without affecting the adjustment of the bearing surfaces relative to each other, a nut 2a may be interposed between the sleeve member 5b and the supporting structure 1 so that by adjusting the nut 2a along the bolt to provide the necessary or desired adjustment of the bearing surfaces, such adjustment will remain fixed when the bolt is attached to its supporting structure 1.

It will also be noted that when the sleeve members 5a and 5b are assembled with the member 10, the bearing will not only transmit loads circumferentially but will resist lateral forces in either direction due to the engagement of the oppositely facing cone surfaces.

The bottom of the groove 12, defined on the exterior surface of the bearing member 10, may be provided with one or more small bores 13 through which lubricant may pass to lubricate the cone bearing surfaces, and to render the bearing substantially self-lubricating the entire recess 12 may be filled with cord or wick packing 14 saturated with oil or other lubricant.

As pointed out hereinbefore, this bearing structure before described may be readily used for pulleys over which cables may be trained, in which event the pulley structure itself may be mounted upon the rotating sleeve member 10 or the bearing may be used as a rotary support for a bellcrank by which control rods are interconnected, in which event the bellcrank structure may be readily formed, as illustrated in Figs. 1, 2 and 3 of the drawing, of a pair of matching flange members 15 and 16.

Each of these flange members is formed with a cup-like depression 17 having an axial bore 18 slightly larger than the exterior diameter of the body portion 7 of the sleeves 5a and 5b, the horizontally extending wall 19 of the flange members 15 and 16 engaging the outermost periphery of the bearing member 10, the member 10 being preferably formed with radially extending flanges 10a and 10b to receive and bear upon the wall portions 19. From the inner edge of the cup-like depression 17 a radial flange 20 extends to any desired diameter so that by securing together the meeting faces of the flange members 15 and 16 as by means of screws 21 (see Fig. 1), rivets, spot welding or other suitable securing devices, the assembled structure provides a relatively large diameter device to which bellcrank arms, rod ends or other apparatus may be attached.

By forming the flange members 15 and 16 circular, as shown in Figs. 1 and 3, a plurality of attachment openings or bores 22 may be provided at spaced intervals about the bellcrank assembly to permit the attachment of bellcrank arms or the rod ends at various angular positions relative to each other.

It will also be noted that the assembled flange members 15 and 16, be they used as a bellcrank assembly as shown in the drawing or as pulleys, constitute an exterior covering over the wick packing and aid in holding lubricant in the bearing. The lubricant may be replenished through oil ports 23 formed in one or both of the flange members 15 and 16.

In Fig. 4 I have illustrated a modified form of bearing assembly, in which the cone members 5a and 5b are mounted upon a stationary sleeve 24 having such length that when the bolt 2 is screwed into whatever supporting structure 1 is employed to mount the bearing the bolt will hold the members 5a and 5b in a fixed position relative to each other, making it unnecessary to carefully adjust the positions of the members 5a and 5b relative to each other in mounting the bearing upon the supporting structure and thus facilitating the more rapid mounting of my bearing.

It will therefore be observed that I have provided a bearing structure in which the stationary portions of the bearing may be readily and simply manufactured while the rotary portion or member 10 may be also readily manufactured by a stamping process and may be hardened and then, by the insertion of dies, be trued up or brought back into true circular configuration in the event of any warping which may occur during the hardening process.

While I have shown and described the preferred embodiment of my invention, I do not desire to be limited to any of the details of construction shown or described herein, except as defined in the appended claims.

I claim:

1. In a bearing assembly, a stationary member having upon its exterior surface a pair of spaced frusto-conical surfaces facing each other, a rotary member having its external and internal surfaces substantially parallel with each other and having a shape providing a pair of frusto-conical internal surfaces matching the cone surfaces of said stationary member, opposite ends of said rotary member having a radially extending flange, and a bellcrank structure comprising a pair of complementary members secured together, each having cup-like depressions formed therein to receive said rotary member and to engage said radial flanges thereto.

2. In a bearing assembly, a stationary member having upon its exterior surface a pair of spaced frusto-conical surfaces facing each other, a rotary member having its external and internal surfaces substantially parallel with each other and having a shape providing a pair of frusto-conical internal surfaces matching the cone surfaces of said stationary member, opposite ends of said rotary member having a radially extending flange for receiving and supporting structures to be rotatably mounted by said bearing, and a bellcrank structure comprising a pair of circular disks secured together and each disk having a cup-like depression formed therein to receive and engage the radial flanges of said rotary member.

3. In a bearing assembly, a stationary member comprising a pair of sleeves, each having a frusto-conical surface formed upon one of its ends, a rotary member comprising a sleeve, the interior of which is formed with a pair of oppositely disposed frusto-conical surfaces, each adapted to receive and bear upon the cone surfaces of the sleeves of said stationary member, and an elongated bushing sleeve extending through said stationary member having a length relative to said assembled stationary member sleeves such that a bolt passing therethrough and into a supporting structure will bear upon the ends of said bushing sleeve and hold said stationary member sleeves in such spaced relation to each other to snugly engage the cone surfaces of said sleeves with the co-acting surfaces of the rotary member.

4. In a bearing assembly, a stationary member having upon its exterior surface a pair of spaced frusto-conical surfaces facing each other, a rotary member having its external and internal surfaces substantially parallel with each other and having a shape providing a pair of frusto-conical internal surfaces matching the cone surfaces of said stationary member, opposite ends of said rotary member having a radially extending flange for receiving and supporting structures to be rotatably mounted by said bearing, and a bellcrank structure comprising a pair of circular disks secured together and each disk having a cup-like depression formed therein to receive and engage the radial flanges of said rotary member, the bottoms of said cup-like depressions comprising radial skirts extending inwardly beyond the ends of said stationary member for excluding dirt from said surfaces.

5. In a bearing assembly, a stationary member comprising a pair of truncated cones positioned with their smaller bases adjacent and their axes aligned, said stationary member also including a pair of cylindrical boss members extending outwardly from the larger diameter bases of said cones, a rotary member having its external and internal surfaces substantially parallel with each other and having a shape providing a pair of frusto-conical internal surfaces matching the cone surfaces of said stationary member, opposite ends of said rotary member having a radially extending flange for receiving and supporting structures to be rotatably mounted by said bearing, and a bellcrank structure comprising a pair of circular disks secured to each other and each disk having a cup-like depression formed therein to receive and engage the radial flanges of said rotary member, the bottoms of said cup-like depressions comprising radial skirts extending inwardly into close proximity with said cylindrical bosses and being positioned closely adjacent the larger diameter bases of said truncated cones.

FREDERICK C. WARREN.